United States Patent

Koizumi

[11] Patent Number: 5,151,834
[45] Date of Patent: Sep. 29, 1992

[54] BRAKE RELEASING MECHANISM OF DUPLEX TAPE RECORDER

[75] Inventor: Satoru Koizumi, Higashi Hiroshima, Japan

[73] Assignee: Sharp Kabushiki Kaisha, Japan

[21] Appl. No.: 536,799

[22] Filed: Jun. 12, 1990

[30] Foreign Application Priority Data

Jun. 30, 1989 [JP] Japan .................................. 1-170662

[51] Int. Cl.⁵ ................... G11B 15/68; G11B 15/48; G11B 5/008; B65H 16/10
[52] U.S. Cl. ...................... 360/92; 360/74.1; 360/96.5; 360/96.6; 242/204
[58] Field of Search ............ 360/74.1, 92, 96.5, 360/96.6, 137; 242/199, 201, 204

[56] References Cited

U.S. PATENT DOCUMENTS

| | | | |
|---|---|---|---|
| 4,396,803 | 8/1983 | Hashimoto | 360/92 |
| 4,698,705 | 10/1987 | Umino | 360/92 |
| 4,797,759 | 1/1989 | Koizumi et al. | 360/92 |
| 4,879,613 | 11/1989 | Koizumi et al. | 360/92 |
| 4,899,951 | 2/1990 | Okada et al. | 360/74.1 |

Primary Examiner—A. J. Heinz
Assistant Examiner—Jefferson Evans
Attorney, Agent, or Firm—Nixon & Vanderhye

[57] ABSTRACT

A brake releasing mechanism of a duplex tape recorder which holds two or more tape cassettes ($T_1$, $T_2$) laid one over another in a cassette holder and includes a single capstan shaft and reels (4,5) correlated with the tape cassettes, so as to selectively feed tape in the tape cassettes at a specified speed, comprises a brake levers (17,15) engaged with the reels in the cassette holder for braking the reels and a lock lever (8) for moving the brake lever to release the reels from braking.

9 Claims, 7 Drawing Sheets

BRAKE RELEASING MECHANISM OF DUPLEX TAPE RECORDER

BACKGROUND OF THE INVENTION (i) Field of the Invention

The present invention relates to a brake releasing mechanism of a duplex tape recorder, and more specifically, to a brake releasing mechanism of a reel for taking up tape in a duplex tape recorder which is capable of holding a plurality of tape cassettes laid one over another.

(ii) Description of the Prior Art

Conventionally, a duplex tape recorder which holds two tape cassettes T1, T2 laid one over the other is provided with braking means for stopping the rotation of a reel only for the tape cassette T2. The braking means is correlated with the operation of operating means (PLAY, REC, FF, REW, etc.) of the tape recorder to release its braking action to the reel (see Unexamined Japanese Patent Publication No. 185056/1983, for example).

However, with a conventional brake releasing mechanism of the duplex tape recorder, when tape in the cassette T2 is selected to PLAY, a reel for the tape cassette T1 does not have any braking means for controlling its rotation, whereby tape in the cassette T1 slackens off due to the vibration of the mechanism or the like. Meanwhile, when the tape in the cassette T2 slackens off while tape in the cassette T1 is being played, an adverse effect is exerted on a start-up property during tape feeding, and wow and flutter in the beginning of tape winding.

For all that, when both the tape cassettes T1, T2 have their respective braking means, the cassettes can not be easily inserted or removed. Especially when the rotation of the reel for the cassette T1 is brought under control, the tape in the cassette T2 is not easily drawn out, and furthermore the cassettes T1, T2 are not easily inserted into the tape recorder.

SUMMARY OF THE INVENTION

The present invention provides a brake releasing mechanism of a duplex tape recorder which holds two or more tape cassettes laid one over another in a cassette holder and includes a single capstan shaft and reels correlated with the tape cassettes and two or more pinch rollers corresponding to the number of tape cassettes, which are made in contact with the capstan shaft so as to selectively feed tape in the tape cassettes at a specified speed, comprising braking means engaged with the reels in the cassette holder for braking the reels and brake releasing means for moving the braking means to keep the braking means in a free position where the braking means are not engaged with the reels.

Thus, in the duplex tape recorder according to the present invention, the braking means are correlated to the tape cassettes and the specified brake releasing means appropriately release the brakes, whereby a plurality of tape cassettes can be easily inserted into the tape recorder, while tape in the cassettes never slackens off when played, whereby the above-mentioned disadvantages of the prior art embodiments can be overcome.

DETAILED DESCRIPTION OF THE PREFERRED EMBODIMENTS

Embodiments of the present invention will be described in detail in conjunction with FIGS. 1 to 8. However, the present invention is not limited to the precise form and manner described herein.

Figure 1:
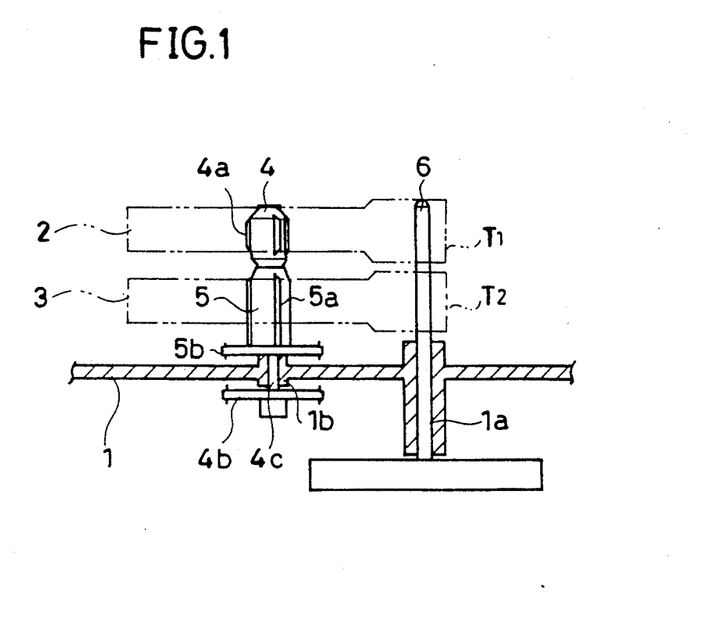
FIG. 1 is a sectional view showing tape cassettes disposed in an embodiment of the present invention.

FIG. 1 shows an exemplary arrangement of tape cassettes; a plurality of, for example, two tape cassettes, T1 cassette 2 and T2 cassette 3, are laid one over another. A capstan metal 1a capstan shaft 6. A hollow shaft 1b of a chassis 1 is coaxial T1 and T2 reels 4, 5. The T1 and T2 cassettes 2, 3 can independently operate.

Figure 2:
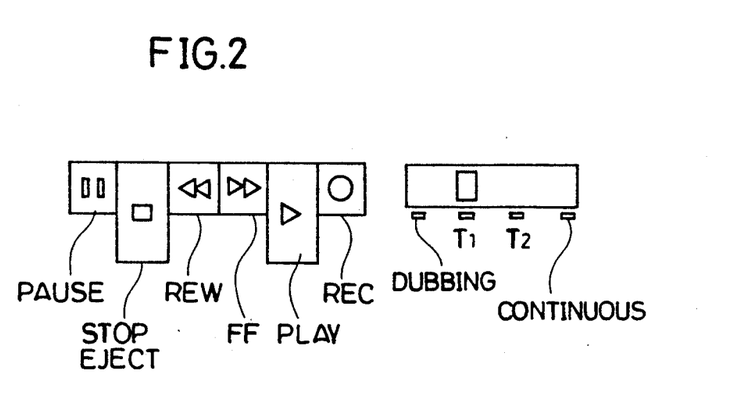
FIG. 2 is a front view showing an exemplary arrangement of operating buttons.

FIG. 2 shows an exemplary arrangement of operating buttons for changing a mode of the duplex tape recorder.

Figure 3:
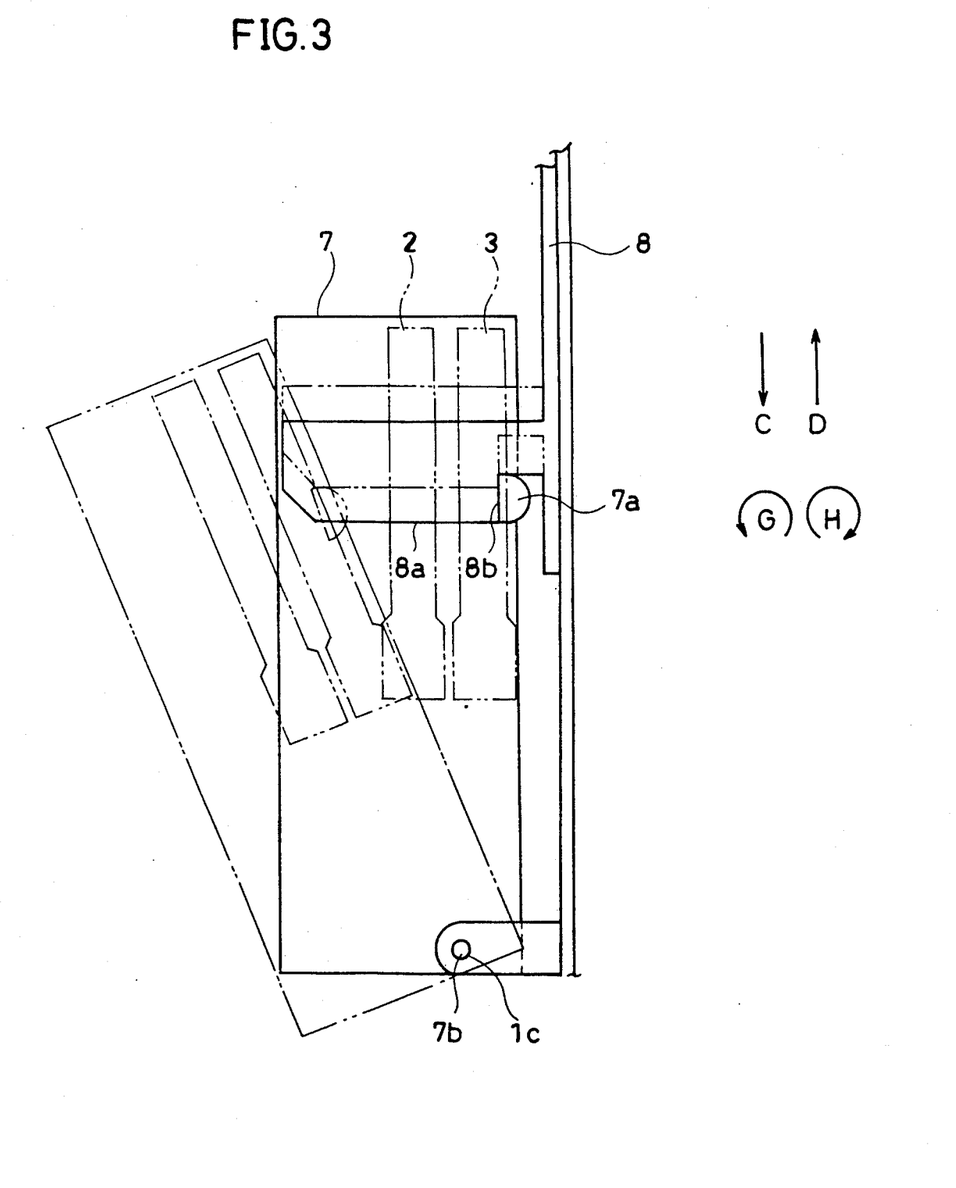
FIG. 3 is a side view for explaining the movement of a lock lever engaged with a cassette holder to keep it in position.

FIG. 3 is a diagram for explaining the movement of a lock lever 8 which is engaged with and supports a cassette holder 7 holding the tape cassettes 2, 3. The cassette holder 7 has its supporting shaft 7b inserted into a hole 1c which is formed in the chassis 1, and pivots about the supporting shaft 7b.

The tape cassettes 2, 3 are put in the cassette holder 7 opening up to a position shown by a two-dot-chain line because of its pivotal movement, and then the cassette holder 7 is pressed to pivot about the supporting shaft 7b in a direction corresponding to an arrow H to keep the cassettes 2, 3 in position. With the operation, an engaging part 7a of the cassette holder 7 moves a guide 8a of the lock lever 8, which is urged to move in a direction corresponding to an arrow C by a spring 9 mentioned below, up to the position shown by the two-dot-chain line, and the cassette holder 7 is moved to a closed position shown by a solid line and kept with the engaging part 7a locked by a lock 8b of the lock lever 8 which is returned to the original position shown by the solid line.

To remove the tape cassettes 2 and 3, the lock lever 8 is moved against a pulling force of the spring 9 in a direction corresponding to an arrow D to release the engaging part 7a from the lock 8b, and the cassette holder 7 pivots from the position shown by the solid line to the open position shown by the two-dot-chain line.

Figure 4:
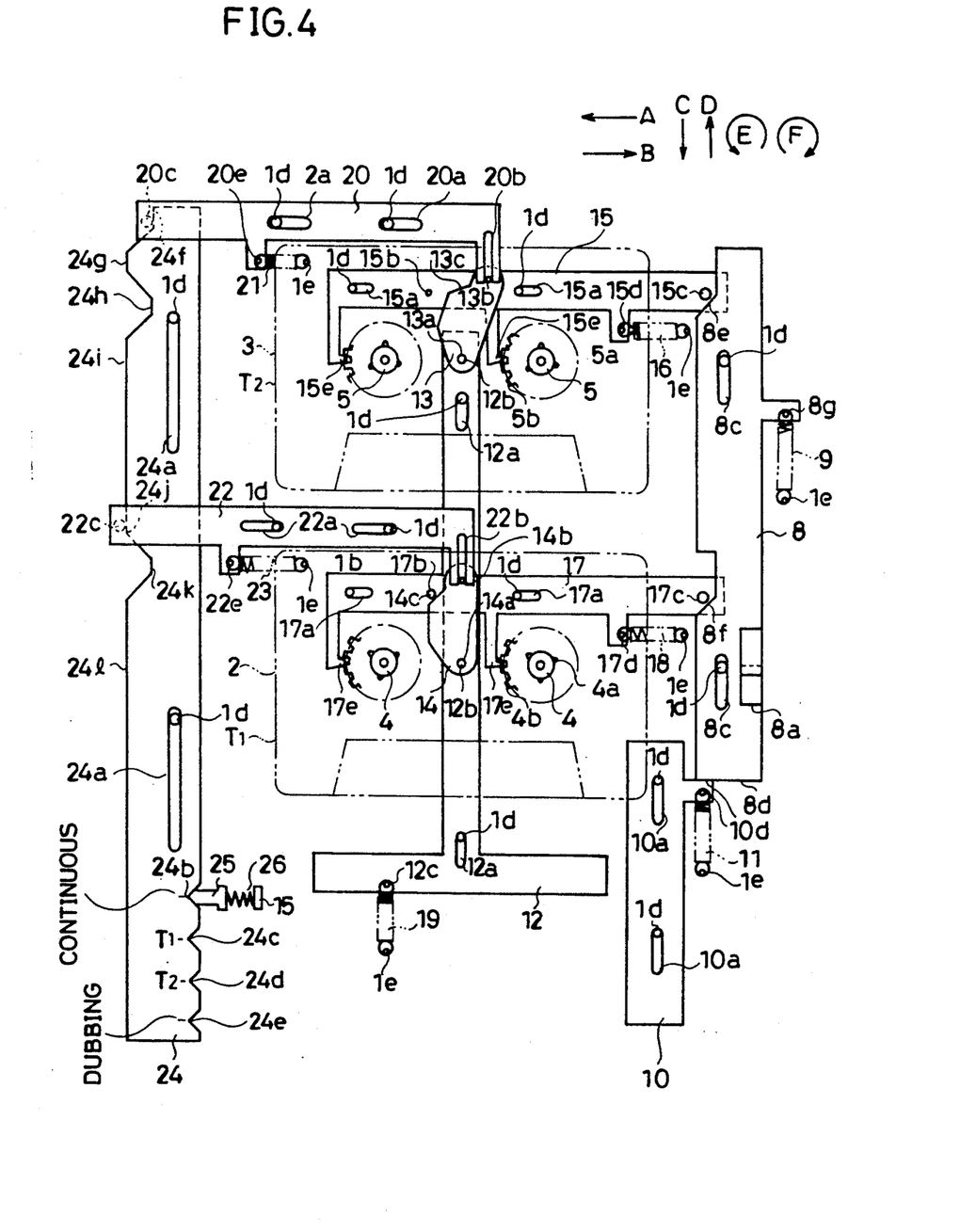
FIGS. 4 to 6 are diagrams respectively showing a state of the embodiment in which a continuous mode operation is stopped, a state in which the tape cassettes are being ejected and a state in which operating means are working.
Figure 5:
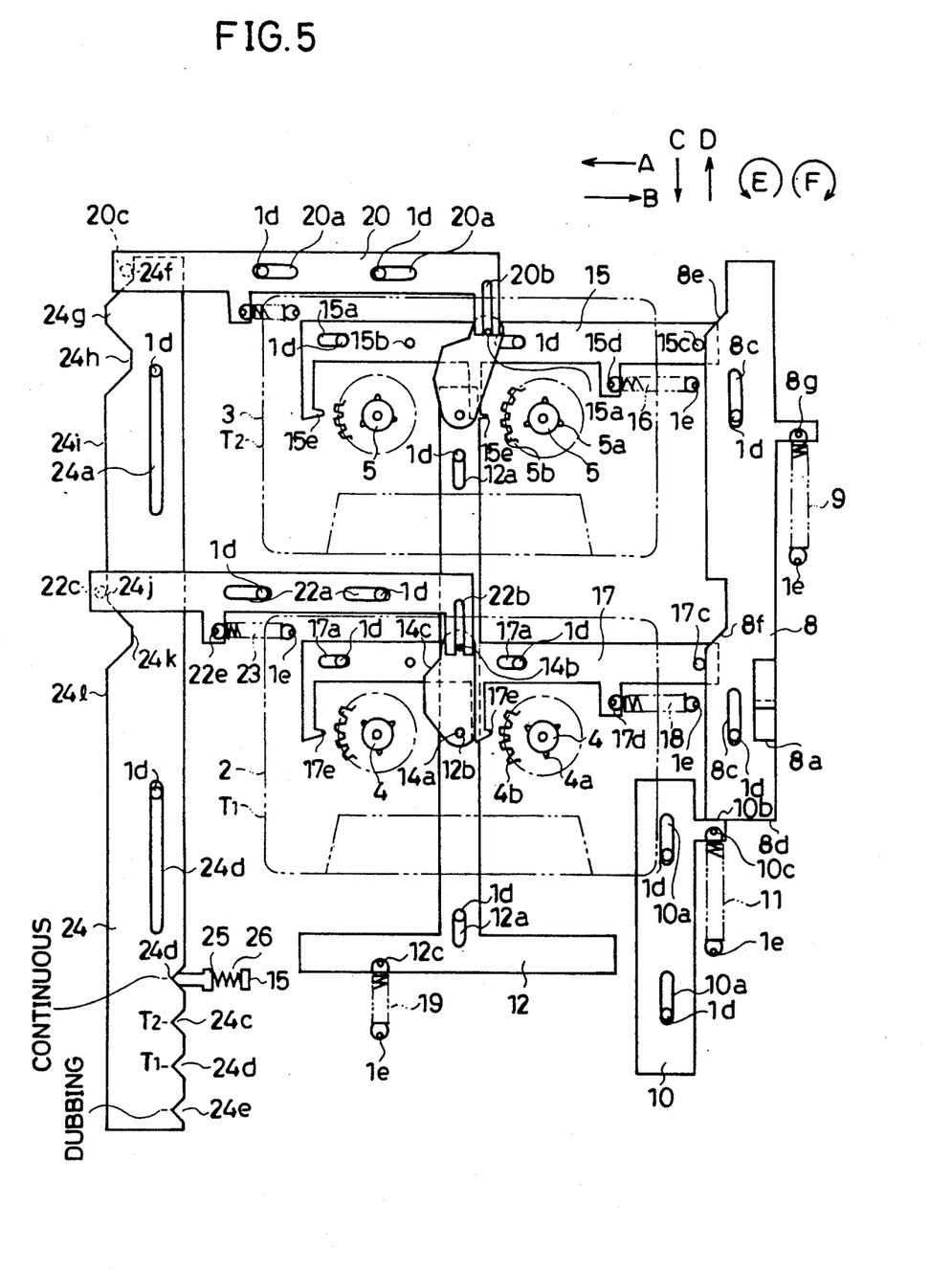
Figure 6:
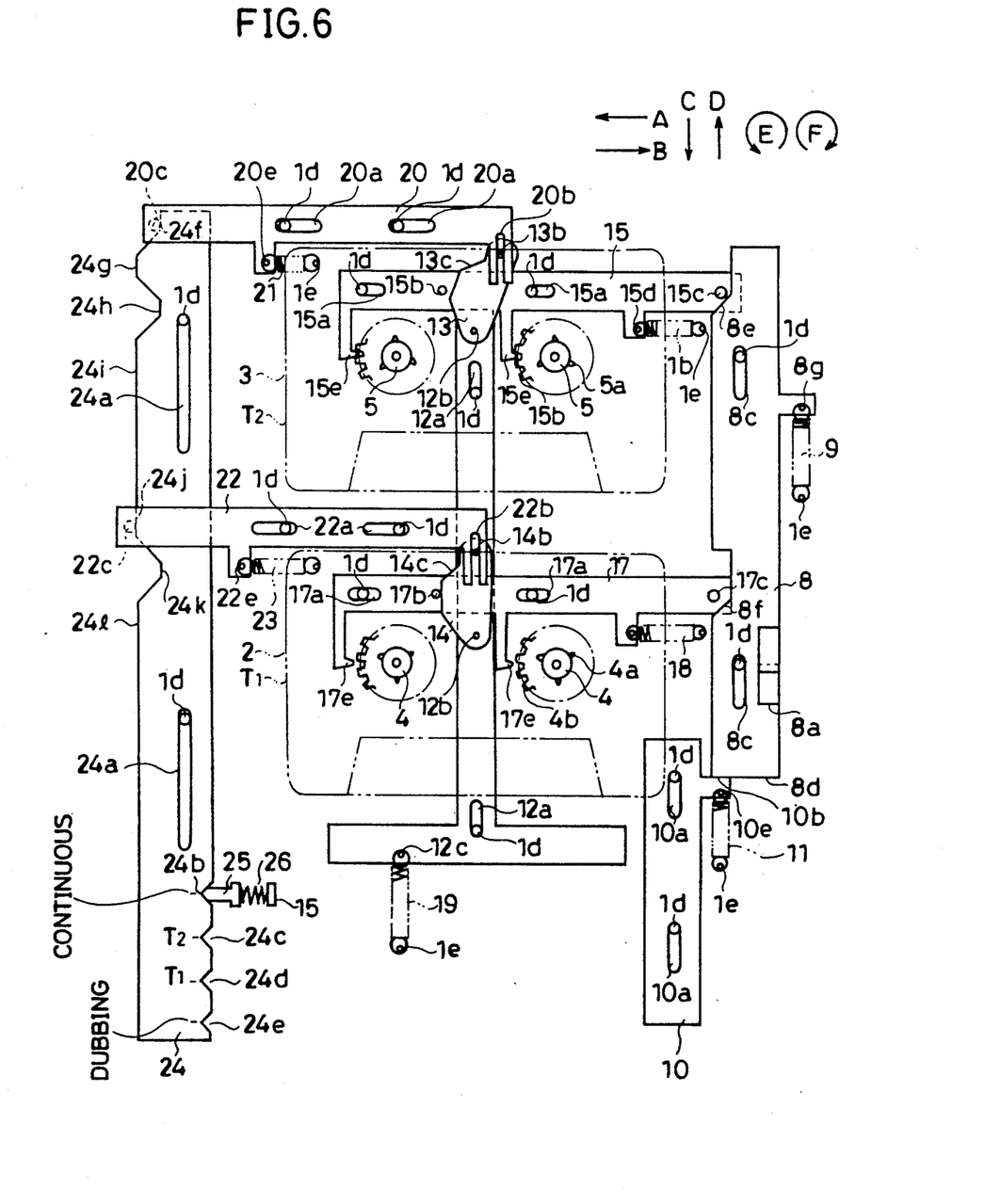
Figure 7:
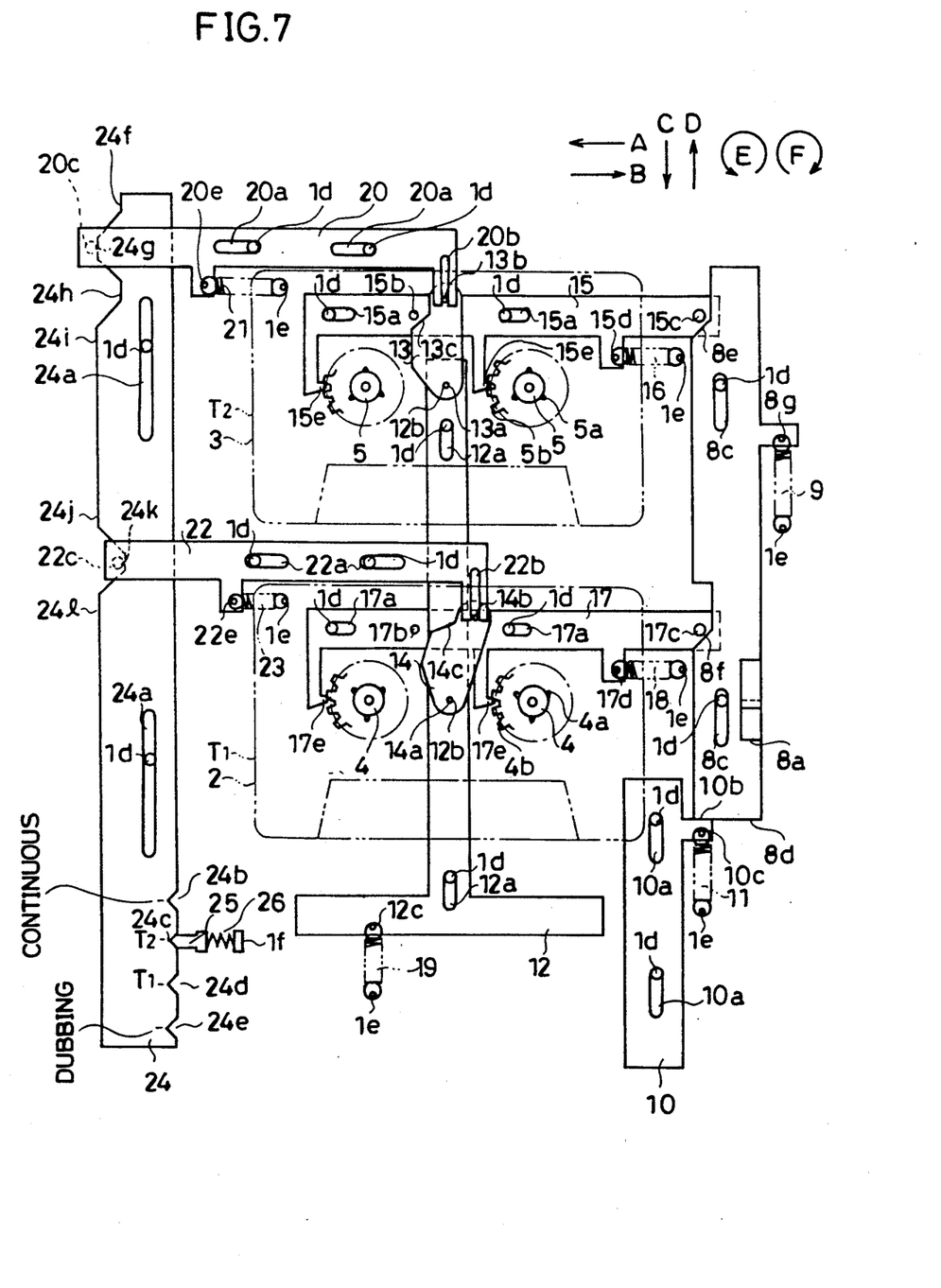
FIGS. 7 and 8 are diagrams respectively showing a state in which a T2 mode operation is stopped and a state in which the operating means are working.
Figure 8:
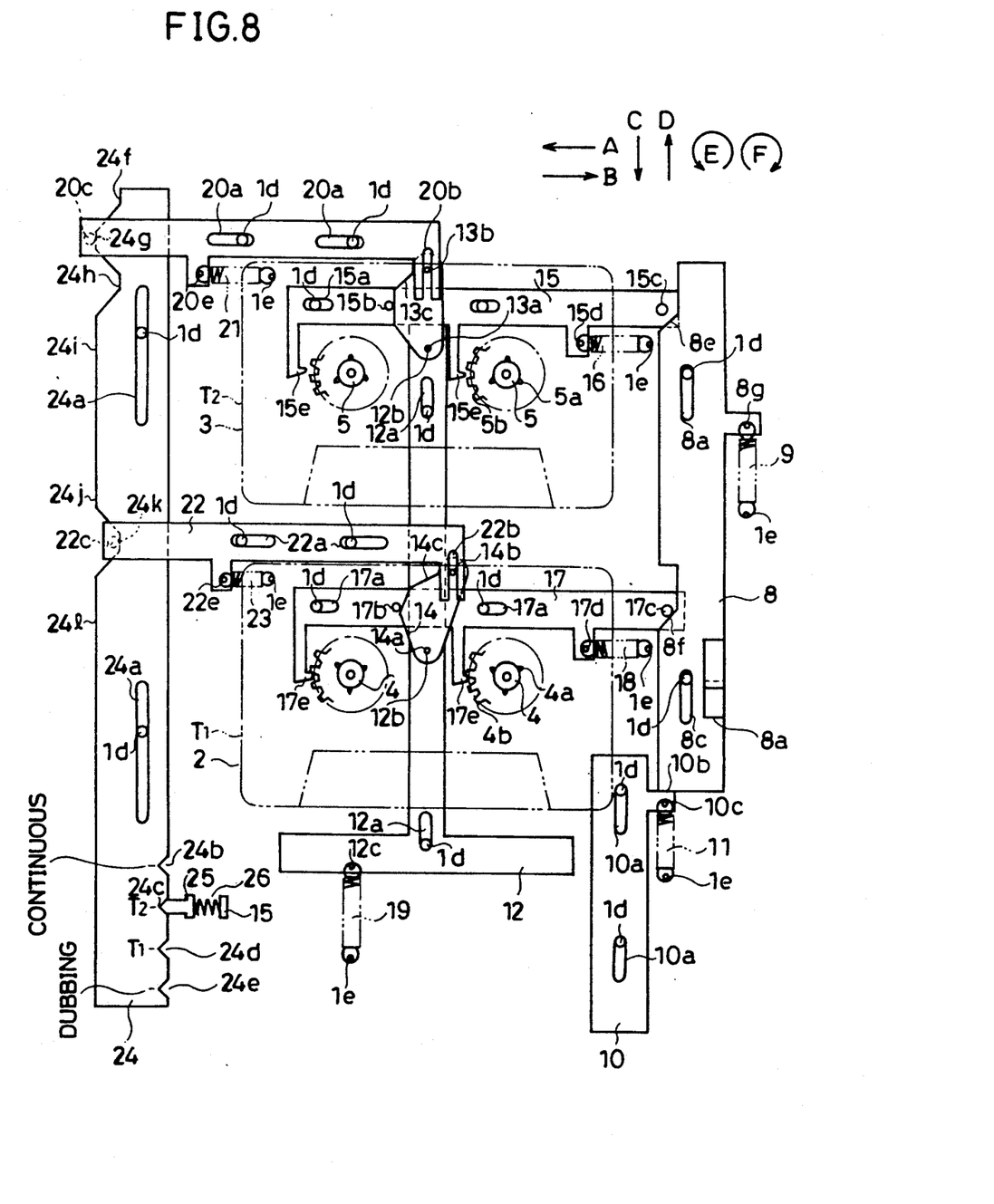

FIGS. 4 to 8 are diagrams for explaining a brake mechanism, showing its vertically overlaid structure rearranged into a side by side structure in a plan view for convenience. FIGS. 4 to 6 respectively show a state in which a continuous mode operation is stopped, a state in which the tape cassettes are being ejected and a state in which operating means (PLAY, REC, FF, REW, etc.) are working, while FIGS. 7 and 8 show respectively a state in which T2 mode operation is stopped and a state in which the operating means are working.

A T1 reel 4 has a plurality of reel vanes 4a in its circumference and has a rotation transmitting gear 4b and a shaft 4c rotatably linked with the T1 tape cassette 2. Similarly, a T2 reel 5 for the T2 tape cassette 3 has a plurality of reel vanes 5a and a rotation transmitting gear 5b. The gears 4b, 5b of the reels 4, 5 are driven by low and high speed feeding mechanisms (not shown) through manipulating the operating means to take up magnetic tape (not shown) in the T1 and T2 tape cassettes 2 and 3.

The lock lever 8 is provided with two guide holes 8c in the longitudinal direction, slidably fitting on guide pins 1d of the chassis 1. Stoppers (not shown) prevent the guide pins 1d from sliding out of the guide holes 8c. An EJECT lever 10 is placed in the same direction as the lock lever 8 and is provided with two guide holes 10a in the longitudinal direction, slidably fitting on the guide pins 1d of the chassis 1. Also the EJECT lever 10 is provided with a pressing part 10b projecting from its side to come in contact with a contact part 8d of the lock lever 8, and a spring 11 extending between hooks 10c, 1e provided in the pressing part 10b and the chassis 1 always urges the EJECT lever 10 in the direction corresponding to the arrow C.

The lock lever 8 is formed with a first releasing part 8e and a second releasing part 8f, and is always urged in the direction corresponding to the arrow C by a spring 9 extending between a hook 8g of the lock lever 8 and the hook 1e of the chassis 1. First and second brake levers 15, 17 are provided with engaging pins 15c, 17c positioned orthogonal to the lock lever 8 so that the engaging pins 15c, 17c are engaged with first and second releasing parts 8e, 8f of the lock lever 8, and when the lock lever 8 is moved in the direction corresponding to the arrow D against a pulling force of the spring 9, the engaging pins 15, 17c press the first and second brake levers 15, 17 and hold them in a non-braking position where the reels 5, 4 are not controlled in rotation.

The cassette holder 7 is always urged in a direction corresponding to an arrow G shown in FIG. 3 by a pressing means (not shown) with the supporting shaft 7b as the center, and when the EJECT lever 10 is pressed in the direction corresponding to the arrow D against a pulling force of the spring 11, the lock lever 8 is pressed through the pressing part 10b of the EJECT lever 10 in the direction corresponding to the arrow D. This causes the lock 8b not to catch the engaging part 7a of the cassette holder 7, and hence the cassette holder 7 pivots in the direction corresponding to the arrow G so as to be able to easily remove both the tape cassettes 2, 3.

A brake release lever 12 is placed in the direction orthogonal to the first and second brake levers 15, 17. The brake release lever 12 is provided with two guide holes 12a in the longitudinal direction, slidably fitting on the guide pins 1d of the chassis 1. The brake release lever 12 is always urged in the direction corresponding to the arrow C by a spring 19 extending between a hook 12c of the brake release lever 12 and the hook 1e of the chassis 1, while it is pressed in the direction corresponding to the arrow D against a pulling force of the spring 19 through manipulating the operating means (PLAY, REC, FF, REW, etc.).

On the brake release lever 12, first and second release arms 13, 14 are pivotably attached to a supporting shaft 12b. Engaging pins 13b, 14b of the release arms 13, 14 are slidably engaged with guide grooves 20b, 22b formed in bent ends of first and second link levers 20, 22 mentioned below, respectively. Pressing parts 13c, 14c formed in the first and second release arms 13, 14 press release pins 15b, 17b of the first and second brake levers 15, 17 to move the first and second brake levers 15, 17 in the direction corresponding to the arrow A, when the first and second arms 13, 14 are rotated about the supporting shaft 12b in the direction corresponding to the arrow E.

The first brake lever 15 is provided with two guide holes 15a in the longitudinal direction, slidably fitting on the guide pins 1d of the chassis 1, and it is always urged in the direction corresponding to the arrow B by a spring 16 extending between a hook 15d of the first brake lever 15 and the hook 1e of the chassis 1. An engaging part 15e is provided in an end portion projecting from the first brake lever 15 to the T2 reel 5, which is engaged with the gear 5b of the T2 reel 5 to control the rotation.

The second brake lever 17 is structured similar to the first brake lever 15. Specifically, the second brake lever 17 is provided with two guide holes 17a slidably fitting on the guide pins 1d, 1d and it is always urged in the direction corresponding to the arrow B by a spring 18 extending between hooks 17d and 1e. An engaging part 17e is provided in an end portion projecting from the second brake lever 17 to the T1 reel 4, which is engaged with the gear 4b of the T1 reel 4 to control the rotation.

The first link lever 20 is provided with two guide holes 20a in the longitudinal direction slidably fitting on the guide pins 1d, 1d and it is always urged in the direction corresponding to the arrow B by a spring 21 extending between a hook 20e of the first link lever 20 and the hook 1e of the chassis 1. The first release arm 13 is rotated in the direction corresponding to the arrow E by the guide groove 20b with which the engaging pin 13b is engaged, when the first link lever 20 is moved in the direction corresponding to the arrow A against a pulling force of a spring 21. Reversely, the first release arm 13 is rotated in the direction corresponding to the arrow F by the engaging pin 13b when the first link lever 20 is moved in the direction corresponding to the arrow B by a spring 21.

The second link lever 22 is structured similar to the first link lever 20. Specifically, the second link lever 22 is provided with two guide holes 22a in the longitudinal direction slidably fitting on the guide pins 1d, 1d and it is always urged in the direction corresponding to the arrow B by a spring 23 extending between a hook 22e of the second link lever 22 and the hook 1e of the chassis 1. The second link lever 22 moves in the direction corresponding to the arrow A or B to rotate the second release arm 14 about the supporting shaft 12b in the direction corresponding to the arrow E or F.

A select plate 24 is provided orthogonal to the first and second link levers 20, 22. The select plate 24 is provided with two guide holes 24a in the longitudinal direction, slidably fitting on the guide pins 1d, 1d and it is also provided with four V-shaped notches 24b to 24e on a side close to the brake release lever 12. A positioning pin 25 is engaged with any one of the V-shaped notches 24b to 24e to keep the select plate 24 in position. The positioning pin 25 is always pressed against the select plate 24 by a spring 26, and when engaged with the first notch 24b, it permits the duplex tape recorder to be kept in a continuous mode. As the select plate 24 is moved to engage with the positioning pin 25 in positions corresponding to the second to fourth notches 24c to 24e in this order, the operation of the duplex tape recorder is changed over into T2 mode, T1 mode, and a dubbing mode, sequentially.

The select plate 24 is also provided on the other side with first concave and convex parts 24f, 24g, third convex and concave parts 24j, 24k in and a fourth concave part 24l. When the T2 mode, the T1 mode or the dubbing mode is specified by the select plate 24, the first concave and convex parts 24f, 24g are engaged with an engaging pin 20c placed in one end of the first link lever 20 to determine a position of the first link lever 20 corresponding to each of the modes, while the third convex and concave parts 24j, 24k and the fourth convex part 24l are engaged with an engaging pin 22c placed in one end of the second link lever 22 to determine a position of the second link lever 22 corresponding to each of the modes.

Next, the operation of the mechanism will be described.

As shown in FIG. 4, while the select plate 24 is set in a position of the continuous mode, the engaging pin 20c of the first link lever 20 is in contact with the first concave part 24f, whereby the first release arm 13 is rotated about the supporting shaft 12b in the direction corresponding to the arrow F by the guide groove 20b engaged with the engaging pin 13b but is not engaged with the release pin 15b of the first brake lever 15.

On the other hand, the engaging pin 22c of the second link lever 22 is in contact with the third convex part 24j of the select plate 24, and hence the second release arm 14 is not rotated but is able to press the release pin 17b. In this state, when the operating means works, the brake release lever 12 is pressed in the direction corresponding to the arrow D as shown in FIG. 6. With this operation, the first release arm 13 does not press the first brake lever 15 because the pressing part 13c does not come into contact with the release pin 15b, but the pressing part 14c of the second release arm 14 moves the second brake lever 17 in the direction corresponding to the arrow A through the release pin 17b, so that the engaging part 17e is moved to a position where it does not engage with the gear 4b of the T1 reel 4.

This permits the T1 reel 4 to rotate, and tape in the T1 tape cassette 2 runs in the continuous mode specified by the select plate 24. At this time, since the gear 5b of the T2 reel 5 is braked by the engaging part 15e of the first brake lever 15, the T2 reel 5 keeps the T2 tape cassette 3 without slack of magnetic tape therein. When the operating means is stopped, the brake release lever 12 is returned to a state shown in FIG. 4 by a pulling force of the spring 19, and then the gear 4b of the T1 reel 4 is braked through an engagement with the engaging part 17e of the second brake lever 17 moved in the direction corresponding to the arrow B by the spring 18.

FIG. 7 shows a state in which the T2 mode is specified by the select plate 24. In this case, since the first link lever 20 is moved in the direction corresponding to the arrow A by the engaging pin 20c engaged with the first convex part 24g, the first release arm 13 can press the first brake lever 15. Meanwhile, since the engaging pin 22c of the second link lever 22 engages with the third concave part 24k of the select plate 24 to rotate the second release arm 14 in the direction corresponding to the arrow F, the second release arm 14 can not press the release pin 17b of the second brake lever 17.

In this state, when the operating means works, the brake release lever 12 is pressed in the direction corresponding to the arrow D to a position shown in FIG. 8.

At this time, because of an engagement of the first release arm 13 with the releasing pin 15b, the T2 reel 5 is released from a braking action of the first brake lever 15, but since the second release arm 14 is not engaged with the release pin 17b, the T1 reel 4 is not released from a braking action of the second brake lever 17. Thus, the T2 reel 5 alone, as specified as the T2 mode, is permitted to rotate.

When the T1 mode is specified by the select plate 24, since the engaging pin 20c engages with the second concave part 24h, the T2 reel 5 is not released from braking. When the dubbing mode is specified by the select plate 24, the engaging pin 20c of the first link lever 20 engages with the second convex part 24i, while the engaging pin 22c of the second link lever 22 engages with the fourth convex part 24l, so that the T1 and T2 reels 4, 5 are released from braking through manipulating the operating means.

As has been described, since reels which are not specified by the select plate 24 are not released from braking, the magnetic tape can be prevented from slackening. This function of preventing the magnetic tape from slackening is obtained by employing a mechanism in which an engagement of the brake release lever 12 cooperating with the operating means with the first and second brake levers 15, 17 is cut off depending upon a mode-specifying position in the select plate 24.

Meanwhile, setting the cassette holder 7 holding the cassettes 2, 3 one over another to its closed position, the reels 4, 5 are released from braking by the first and second brake levers 15, 17 and can be smoothly rotated, and thus the cassette holder 7 can be set in its close position under an improved condition. Removing the cassette 2, 3 through an EJECT operation, the reels 4, 5 are released from braking while the cassettes 2, 3 are coming off from the reels 4, 5. In this way, the T2 cassette 3 can easily come off from the T1 reel 4, and thus the cassettes can be removed under an improved condition. A mechanism for implementing an improvement of a removal of the cassettes is attained by a structure in which the engaging part 7a of the cassette holder 7 holds the lock lever 8, moving along a specified length, to release the reels 4, 5 from the first and second brake levers 15, 17 when the cassette holder 7 is set in its closed position and when the EJECT lever 10 is working.

The above embodiment is a case in which two tape cassettes are held in the mechanism but can be applied to a case in which three or more tape cassettes are to be held.

As has been described, according to the present invention, reels are not released from braking cooperatively with an operating means in a mode other than that specified by a select plate, while braking means are moved to a position in which they do not engage with the reels while tape cassettes are being ejected, whereby magnetic tape in the tape cassette which is not in use is prevented from slackening, and additionally, the tape cassettes can be removed smoothly.

What is claimed is:

1. A duplex tape recorder which holds two tape cassettes laid one over another for recording and reproducing, the duplex tape recorder comprising:
a first reel engagable with an upper tape cassette for driving a tape in the upper tape cassette;
a second reel which is coaxial with the first reel and engagable with the lower tape cassette for driving a tape in the lower tape cassette;

cassette holder means for holding the upper and lower tape cassettes laid one over another, the cassette holder means being movable between a first position in which the upper and lower tape cassettes can be removed therefrom and a second position in which the upper and lower tape cassettes can engage the first and second reels, respectively;

mode selecting means for selecting one of a plurality of modes, the modes including a $T_1$ mode in which reproduction is performed only for the upper tape cassette, a $T_2$ mode in which reproduction is performed only for the lower tape cassette, and a dubbing mode in which recorded output of one of the tape cassettes is recorded by the other tape cassette;

locking means for locking the cassette holder means in the second position;

eject means for releasing the locking means;

first braking means for braking the rotation of the first reel;

second braking means for braking the rotation of the second reel;

brake preset means for presetting the first and/or second braking means in accordance with the mode selected by the mode selecting means;

first brake releasing means for releasing the first and second braking means in response to the operation of the eject means;

tape-driving mode means which is driven with the operation for driving the upper and/or lower cassettes; and, second brake releasing means for releasing braking force exerted on one of the first and second reels which drives the tape in correspondence with the preset state of the first and/or second braking means by the brake preset means, when the tape-driving mode means is operated.

2. A duplex tape recorder which holds two tape cassettes laid one over the other for recording and reproducing, the duplex tape recorder comprising:

a first reel engagable with an upper tape cassette for driving a tape in the upper tape cassette;

a second reel which is coaxial with the first reel and engagable with the lower tape cassette for driving a tape in the lower tape cassette;

cassette holder means for holding the upper and lower tape cassettes laid one over another, the cassette holder means being movable between a first position in which the upper and lower tape cassettes can be removed therefrom and a second position in which the upper and lower tape cassettes can engage the first and second reels, respectively;

first braking means for selectively engaging and disengaging the first reel and for braking the rotation of the first reel when engaged therewith;

second braking means for selectively engaging and disengaging the second reel and for braking the rotation of the second reel when engaged therewith;

brake release means movable to a lock position and to an unlock position, the brake release means being engageable with the cassette holder means and coupled to the first braking means and the second braking means, the brake releasing means when moved to the unlock position serving for disengaging the first braking means from the first reel, for disengaging the second braking means from the second reel, and for permitting the cassette holder means to move to the first position.

3. The apparatus of claim 2, further comprising eject lever means for moving the brake release means to an unlocked position.

4. A duplex tape recorder which holds two tape cassettes laid one over the other for recording and reproducing, the duplex tape recorder comprising:

a first reel engagable with an upper tape cassette for driving a tape in the upper tape cassette;

a second reel which is coaxial with the first reel and engagable with the lower tape cassette for driving a tape in the lower tape cassette;

braking means for selectively engaging and disengaging an associated one of the reels and for braking the rotation of the associated reel when engaged therewith;

select means movable through a plurality of positions in accordance with a corresponding plurality of modes of operation of the recorder;

brake release lever means;

linkage means having a first end engagable with the select means and a second end;

pivoting arm means pivotally attached to the brake release lever means and engaged by a second end of the linkage means, the pivoting arm means being selectively pivotal in accordance with the position of the select means to a first pivotal position and to a second pivotal position, pivoting of the pivoting arm means to the first pivotal position causing pivoting arm means to engage the braking means and the braking means to engage the associated reel, pivoting of the pivoting arm means to the second pivotal position causing the braking means to disengage the associated reel.

5. The apparatus of claim 4, wherein movement of the brake release lever means causes the pivoting arm means, pivoted to the first pivotal position, to disengage the braking means and the braking means to disengage the associated reel.

6. The apparatus of claim 4, wherein the select means and the brake release lever means are reciprocatably moveable in a first direction.

7. The apparatus of claim 6, wherein the linkage means and the braking means are reciprocatably moveable in a second direction, and wherein the second direction is essentially orthogonal to the first direction.

8. The apparatus of claim 4, further comprising lock lever means for simultaneously moving the braking means out of engagement with the associated reel.

9. The apparatus of claim 4, further comprising:

cassette holder means for holding the upper and lower tape cassettes laid one over another, the cassette holder means being movable between a cassette holder first position in which the upper and lower tape cassettes can be removed therefrom and a cassette holder second position in which the upper and lower tape cassettes can engage the first and second reels, respectively;

lock lever means for simultaneously moving the braking means out of engagement with the associated reel and permitting the cassette hold means to move from the cassette holder second position to the cassette holder first position.

* * * * *